US011961090B2

(12) United States Patent
Yamada

(10) Patent No.: US 11,961,090 B2
(45) Date of Patent: Apr. 16, 2024

(54) PAYMENT SUPPORT SYSTEM, PAYMENT SUPPORT METHOD, AND NON-TRANSITORY RECORDING MEDIUM

(71) Applicant: GURUNAVI, Inc., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 68 days.

(21) Appl. No.: 16/829,652

(22) Filed: Mar. 25, 2020

(65) Prior Publication Data
US 2020/0311730 A1 Oct. 1, 2020

(30) Foreign Application Priority Data
Mar. 26, 2019 (JP) .................................. 2019-058226

(51) Int. Cl.
*G06Q 20/40* (2012.01)
*G06Q 20/14* (2012.01)
(Continued)

(52) U.S. Cl.
CPC ......... *G06Q 20/405* (2013.01); *G06Q 20/145* (2013.01); *G06Q 20/204* (2013.01); *G06Q 20/3223* (2013.01); *G06Q 20/425* (2013.01)

(58) Field of Classification Search
CPC .. G06Q 20/405; G06Q 20/145; G06Q 20/204; G06Q 20/3223; G06Q 20/425
See application file for complete search history.

(56) References Cited

U.S. PATENT DOCUMENTS

2006/0136303 A1* 6/2006 Bell ....................... G07G 3/003
705/26.1
2008/0103752 A1* 5/2008 Enomoto .................. G06F 8/34
703/23
(Continued)

FOREIGN PATENT DOCUMENTS

JP 2004252751 A 9/2004
JP 2004356992 A 12/2004
(Continued)

OTHER PUBLICATIONS

Japan Patent Office, Notice of Reasons for Refusal Issued in Application No. 2019-058226, dated Jan. 10, 2023, 9 pages.
(Continued)

*Primary Examiner* — Patrick McAtee
*Assistant Examiner* — Terry Nathan Murray
(74) *Attorney, Agent, or Firm* — Alleman Hall & Tuttle LLP

(57) ABSTRACT

A payment support system includes a communication state determination processing unit, a payment processing unit, and a notification processing unit. The communication state determination processing unit determines a communication state of a user terminal of a user who uses a facility. The payment processing unit executes a process concerning payment of a use price of the facility when the communication state determination processing unit determines that communication of the user terminal has been interrupted. The notification processing unit causes at least one of the user terminal and a facility terminal installed in the facility to notify predetermined information when the communication state determination processing unit determines that communication of the user terminal has been interrupted.

18 Claims, 11 Drawing Sheets

(51) Int. Cl.
*G06Q 20/20* (2012.01)
*G06Q 20/32* (2012.01)
*G06Q 20/42* (2012.01)

(56) References Cited

U.S. PATENT DOCUMENTS

| | | | | |
|---|---|---|---|---|
| 2008/0174421 A1* | 7/2008 | Londhe | .................... | H04L 67/52 |
| | | | | 340/539.13 |
| 2009/0093279 A1* | 4/2009 | Matsuura | ............. | H04B 5/0056 |
| | | | | 455/574 |
| 2010/0020734 A1* | 1/2010 | Nakagawa | ........ | H04W 52/0261 |
| | | | | 370/311 |
| 2012/0102191 A1* | 4/2012 | Rabii | .................... | G06F 9/5011 |
| | | | | 709/224 |
| 2015/0051993 A1* | 2/2015 | Moshfeghi | ......... | G06K 19/0712 |
| | | | | 705/18 |
| 2016/0005016 A1* | 1/2016 | Eliahu | .................... | G06Q 20/28 |
| | | | | 705/44 |
| 2016/0275597 A1* | 9/2016 | Ueda | .................. | G06Q 30/0635 |
| 2017/0142498 A1* | 5/2017 | Blong | ................ | H04N 21/2665 |

FOREIGN PATENT DOCUMENTS

| | | |
|---|---|---|
| JP | 2006004404 A | 1/2006 |
| JP | 201590563 A | 5/2015 |
| JP | 2018022221 A | 2/2018 |
| RU | 2395928 C2 * 7/2010 ............ H04M 15/62 |
| WO | WO-2004034344 A1 * 4/2004 ............ A47F 9/046 |
| WO | 2006087896 A1 | 8/2006 |

OTHER PUBLICATIONS

China National Intellectual Property Administration, Office Action and Search Report Issued in Application No. 202010222715.7, dated Sep. 27, 2023, 29 pages.

* cited by examiner

FIG. 2

| | USER INFORMATION | | | D1 |
|---|---|---|---|---|
| TERMINAL ID | USER ID | USER NAME | PAYMENT INFORMATION |
| 0001 | U001 | A | C1 |
| 0002 | U002 | B | C2 |
| 0003 | U003 | C | C3 |
| 0004 | U004 | D | C4 |
| 0005 | U005 | E | C5 |
| 0006 | U006 | F | C6 |
| 0007 | U007 | G | C7 |
| 0008 | U008 | H | C8 |
| ... | ... | ... | ... |

FIG. 3

| TERMINAL INFORMATION ||||
|---|---|---|---|
| TABLE NUMBER | TERMINAL ID | USE PRICE | COMMUNICATION STATE |
| T1 | ***** | ***** | ***** |
| T2 | ***** | ***** | ***** |
| T3 | 0001 | M1 | P1 |
| T4 | 0002 | M2 | P2 |
| T5 | 0003 | M3 | P3 |
| T6 | 0004 | M4 | P4 |
| | 0005 | M5 | P5 |
| | 0006 | M6 | P6 |
| ... | ... | ... | ... |
| T10 | ***** | ***** | ***** |

| WARNING | 21:30 |

COMMUNICATION HAS BEEN INTERRUPTED.
PAYMENT WILL BE MADE AT (O'CLOCK) : (MINUTES).

| TERMINAL ID | : | 0002 |
| USER ID | : | U002 |
| TABLE NUMBER | : | T4 |
| USE PRICE | : | M2 |
| MEASURED TIME | : | ***** |
| ESTIMATED TIME OF PAYMENT | : | ***** |

| PAYMENT EXECUTION INFORMATION | 21:32 |

PAYMENT WAS MADE BECAUSE COMMUNICATION WAS INTERRUPTED.

| | |
|---|---|
| USER ID : | U002 |
| FACILITY NAME : | RESTAURANT A |
| USE DATE : | ***** |
| USE PRICE : | M2 |
| PAYMENT COMPLETION DATE AND TIME : | ***** |

FIG. 7

| PAYMENT ANNOUNCEMENT INFORMATION 21:32 |

PAYMENT WILL BE MADE BECAUSE COMMUNICATION IS INTERRUPTED.
PAYMENT IS ABORTED IF COMMUNICATION IS RESTORED BY (O'CLOCK): (MINUTES).

| | | |
|---|---|---|
| USER ID | : | U002 |
| FACILITY NAME | : | RESTAURANT A |
| USE DATE | : | ***** |
| USE PRICE | : | M2 |
| ESTIMATED TIME OF PAYMENT | : | ***** |

PAYMENT SUPPORT SYSTEM, PAYMENT SUPPORT METHOD, AND NON-TRANSITORY RECORDING MEDIUM

INCORPORATION BY REFERENCE

This application is based upon and claims the benefit of priority from the corresponding Japanese Patent Application No. 2019-058226 filed on Mar. 26, 2019, the entire contents of which are incorporated herein by reference.

BACKGROUND OF THE INVENTION

1. Field of the Invention

The present disclosure relates to a payment support system, a payment support method, and a non-transitory recording medium.

2. Description of Related Art

There has been proposed a system for use in a restaurant where a user uses his/her mobile terminal (user terminal) to order foods and/or drinks, and uses the mobile terminal to pay the price for the foods and/or drinks. In addition, in recent years, there has been proposed a system for use at a store where a user carrying a mobile terminal can carry outside the store a product that the user desires to buy, and payment of a price of the product is automatically performed.

SUMMARY OF THE INVENTION

A payment support system relating to a first aspect of the present disclosure includes a communication state determination processing unit, a payment processing unit, and a notification processing unit. The communication state determination processing unit determines a communication state of a user terminal of a user who uses a facility. The payment processing unit executes a process concerning payment of a use price of the facility when the communication state determination processing unit determines that communication of the user terminal has been interrupted. The notification processing unit causes at least one of the user terminal and a facility terminal installed in the facility to notify predetermined information when the communication state determination processing circuit determines that communication of the user terminal has been interrupted.

A payment support method relating to a second aspect of the present disclosure causes one or more processors to execute a communication state determination step, a payment step, and a notification step. In the communication state determination step, a communication state of a user terminal of a user who uses a facility, is determined. In the payment step, a process concerning payment of a use price of the facility is executed when it is determined in the communication state determination step that communication of the user terminal has been interrupted. In the notification step, at least one of the user terminal and a facility terminal installed in the facility is caused to notify predetermined information when it is determined in the communication state determination step that communication of the user terminal has been interrupted.

A recording medium relating to a third aspect of the present disclosure is a non-transitory computer-readable recording medium storing a payment support program for causing one or more processors to execute a communication state determination step, a payment step, and a notification step. In the communication state determination step, a communication state of a user terminal of a user who uses a facility, is determined. In the payment step, a process concerning payment of a use price of the facility is executed when it is determined in the communication state determination step that communication of the user terminal has been interrupted. In the notification step, at least one of the user terminal and a facility terminal installed in the facility is caused to notify predetermined information when it is determined in the communication state determination step that communication of the user terminal has been interrupted.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram showing an example of user information used in the payment support system according to the embodiment of the present disclosure;

FIG. 3 is a diagram showing an example of terminal information used in the payment support system according to the embodiment of the present disclosure;

FIG. 5 is a diagram showing an example of a display screen displayed in the payment support system according to the embodiment of the present disclosure;

FIG. 6 is a diagram showing an example of a display screen displayed in the payment support system according to the embodiment of the present disclosure;

FIG. 7 is a diagram showing an example of a display screen displayed in the payment support system according to the embodiment of the present disclosure;

DETAILED DESCRIPTION OF EMBODIMENTS

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
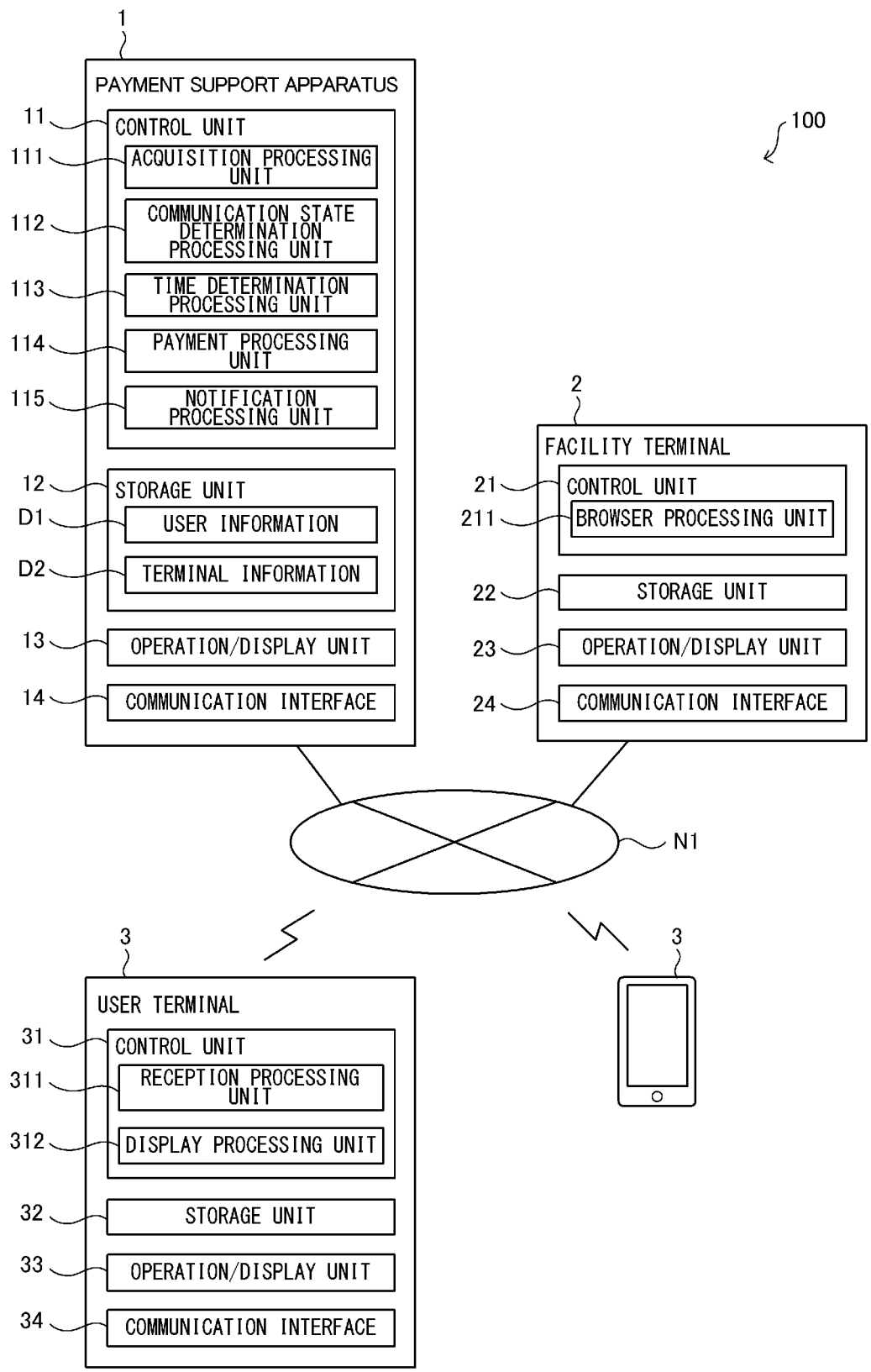
FIG. 1 is a block diagram showing a configuration of a payment support system according to an embodiment of the present disclosure.

As shown in FIG. 1, a payment support system 100 according to an embodiment of the present disclosure includes a payment support apparatus 1, a facility terminal 2, and a user terminal 3. The payment support apparatus 1, the facility terminal 2, and the user terminal 3 can communicate with each other via a communication network N1 that is, for example, the Internet, a LAN, a WAN, or a public telephone line. It is noted that a plurality of payment support apparatuses 1, a plurality of facility terminals 2, and a plurality of user terminals 3 may be provided.

The payment support system according to the present disclosure is applicable to a facility in a business type that provides a service to users, such as a restaurant, a retail store, a hair dresser, a hotel, or a game hall. In the present embodiment, a "restaurant" is provided as an example of a facility according to the present disclosure. For example, the facility terminal 2 is provided on each table in the restaurant. For example, the facility terminal 2 may be an operation terminal (a self-ordering terminal) that is used by users of the restaurant to order desired products (for example, foods and drinks). In addition, the facility terminal 2 may be an operation terminal (an order terminal) that is carried by a staff member of the restaurant so as to input orders received from users. It is noted that an order may be made on the user terminal 3 based on operations of the user. For example, the user activates an application (a restaurant application) on the user terminal 3 to input an order. The payment support apparatus 1 may be installed in a restaurant in which the facility terminal 2 is installed. Alternatively, the payment support apparatus 1 may be installed outside the restaurant, and may perform data communications with the facility terminal 2 and the user terminal 3 via the communication network N1.

In the present embodiment, a single piece of payment support apparatus 1 corresponds to the payment support system according to the present disclosure. However, not limited to this, the payment support system according to the present disclosure may include one or more components among the payment support apparatus 1, the facility terminal 2, and the user terminal 3. For example, in a case where two or more components among the payment support apparatus 1, the facility terminal 2, and the user terminal 3 share a payment support process (see, for example, FIG. 8) described below and execute it cooperatively, a system that includes the two or more components can be considered as the payment support system according to the present disclosure. For example, the payment support system according to the present disclosure may be composed of the payment support apparatus 1 and the user terminal 3. The user terminal 3 is an example of a user terminal of the present disclosure.

Meanwhile, in a system where a mobile terminal of a user (a user terminal) is used to pay a use price, the following problem may occur. For example, the user may perform an illegal act of not paying the use price (leaving without paying the use price) by intentionally interrupting communication of the mobile terminal. In addition, it is difficult to prevent the illegal act since it is difficult for the restaurant side to determine whether or not the use price has been paid.

On the other hand, according to the payment support apparatus 1 of the present embodiment, it is possible to prevent an illegal act in a case where the user terminal 3 of the user is used to make payment at a facility.

Here is described an example of application of the payment support system 100 of the present embodiment. For example, a plurality of tables are installed in a restaurant, and the facility terminal 2 (self-ordering terminal) is installed on each table. A user enters the restaurant while carrying the user terminal 3 (for example, a smartphone) owned by the user. Here, the payment support system 100 has a function to automatically make payment of a use price of the restaurant (a price for food and drink) based on payment information (credit card information) of the user after the user terminal 3 exits the restaurant.

For example, a user, after having entered a restaurant and been seated at a table, causes the user terminal 3 to perform a data communication with the facility terminal 2 to perform a check-in process (described below). Subsequently, the user orders a desired food and/or a drink by operating the facility terminal 2. The payment support apparatus 1 acquires, from the facility terminal 2, information of the food and/or the drink that the user ordered by operating the facility terminal 2, calculates a total use price, and associates the total use price with identification information of the user terminal 3.

Subsequently, after the user finishes a meal and exits the restaurant, the payment support system 100 detects the exit of the user terminal 3 from the restaurant, and performs a payment process of the use price. This allows the user to exit the restaurant without making payment of the use price at the register. Here, for example, if the power supply of the user terminal 3 is in "off" state, the user terminal 3 is interrupted from communicating with external devices, thus the exit of the user terminal 3 may not be detected and the payment process may not be performed normally. Accordingly, there is a possibility that the user may perform an illegal act of not paying the use price by intentionally powering off the user terminal 3 when he/she exits the restaurant after finishing a meal. In view of this, the payment support system 100 is configured to perform a payment process of a use price upon, for example, determining that the user terminal 3 has been interrupted from communicating, and cause at least one of the payment support apparatus 1, the facility terminal 2, and the user terminal 3 to notify that the user terminal 3 has been interrupted from communicating and that the payment process has not been completed. The payment support system 100 of the present embodiment has the above-described configuration to prevent the illegal act.

The following describes a specific configuration of the payment support system 100.

[Payment Support Apparatus 1]

As shown in FIG. 1, the payment support apparatus 1 includes a control unit 11, a storage unit 12, an operation/display unit 13, and a communication interface 14. The payment support apparatus 1 may be an information processing apparatus such as a server, a tablet terminal, or a personal computer. In addition, various processes executed in the payment support apparatus 1 may be executed by a plurality of processors by distribution.

The communication interface 14 is configured to connect the payment support apparatus 1 to the communication network N1 wirelessly or with cable, and execute a data communication with external devices such as the facility terminal 2 and the user terminal 3 via the communication network N1 in accordance with a predetermined communication protocol.

The operation/display unit 13 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 12 is a nonvolatile storage unit such as a HDD (Hard Disk Drive), a SSD (Solid State Drive), or a flash memory that stores various types of information. Data such as user information D1 and terminal information D2 is stored in the storage unit 12. FIG. 2 is a diagram showing an example of the user information D1. FIG. 3 is a diagram showing an example of the terminal information D2.

As shown in FIG. 2, the user information D1 includes various information regarding users of the restaurant. The users register themselves in advance at a web site managed by the restaurant. Specifically, the users use the user terminals 3 to access the web site of the restaurant, and on a user registration screen, register the name, address, mail address, payment information (credit card information) or the like. The payment support apparatus 1 acquires and registers the pieces of information in the user information D1. As shown in FIG. 2, the user information D1 includes information: "terminal ID", "user ID", "user name", and "payment information". The "terminal ID" is identification information of the user terminals 3. The payment support apparatus 1 acquires the identification information of a user terminal 3 when the user terminal 3 accesses the web site. The "user ID" is identification information of users. The user ID may be input by the users themselves or set by the payment support apparatus 1 arbitrarily. The "user name" includes names registered by the users. The "payment information" is information regarding the payment methods registered by the users. The payment information includes, for example, information such as a credit card company, a credit card number, and an expiration date.

It is noted that a user may register the user information D1 before he/she comes to a restaurant or within the restaurant after coming. Having registered the user information D1, the user can use a pay-later payment process for automatically paying a use price of the restaurant after an exit. The user who has not registered the user information D1 needs to perform a normal payment process to pay the use price at the register (account terminal) by cash, credit card, or electronic money when exiting the restaurant.

As shown in FIG. 3, the terminal information D2 includes information regarding the user terminals 3 of the users who visited the restaurant. The terminal information D2 shown in FIG. 3 includes information: "table number", "terminal ID", "use price", and "communication state". The "table number" is information of numbers (identification information) assigned to tables (seats, or private rooms) installed in the restaurant. The "terminal ID" is identification information of the user terminals 3. For example, in a case where user A comes to the restaurant, is seated at a table with table number "T3", and performs a check-in operation on a facility terminal 2 installed on the table by using a user terminal 3, the payment support apparatus 1 acquires a terminal ID "0001" of the user terminal 3, and registers the acquired terminal ID "0001" in the terminal information D2 in association with the table number "T3". The "use price" is information of prices for the foods and drinks eaten by the users of the restaurant. For example, the payment support apparatus 1 acquires information of a food and/or a drink that a user ordered by operating a facility terminal 2, calculates a total use price, and registers the calculated total use price in the terminal information D2 in association with the terminal ID. The use prices are registered in the "use price" for each user. It is noted that in a case where a group of users use one table, the payment support apparatus 1 may register a total use price for all foods and drinks ordered by the group of users, with the terminal information D2 in association with the table. For example, the payment support apparatus 1 may register a total use price ("M4"+"M5"+"M6") of users D, E, and F with the terminal information D2 in association with table number "T6".

The "communication state" is information representing communication states of the user terminals 3. In the "communication state", for example, any one of communication levels "0" to "5" is registered in correspondence with the communication state of each user terminal 3, wherein communication level "0" indicates that communication of the user terminal 3 is interrupted, communication level "1" indicates the worst communication state, and communication level "5" indicates the best communication state. It is noted that in FIG. 3, for convenience's sake, in the "communication state", the communication states are represented by signs "P1" to "P6" in correspondence with terminal IDs "0001" to "0006". The communication state of the user terminal 3 can be determined by a well-known method. For example, the payment support apparatus 1 determines the communication state based on: the connection state, radio wave intensity, and communication speed between the user terminal 3 and an access point (not shown) of a wireless LAN installed in the restaurant. When the connection state between the user terminal 3 and the access point is an interrupted state or an off-line state, or the position information of the user terminal 3 cannot be acquired, the control unit 11 of the payment support apparatus 1 registers "0" in the "communication state", and when the connection state between the user terminal 3 and the access point is in on-line state, the control unit 11 registers, in the "communication state", any one of the confirmation levels ("1" to "5") in accordance with the values of indexes such as the radio wave intensity and the communication speed.

The information registered in the terminal information D2 may be deleted, for example, after the payment of the use price is completed.

It is noted that as another embodiment, part or all of the information such as the user information D1 and the terminal information D2 may be recorded in the facility terminal 2, or stored in a server which can be accessed by the payment support apparatus 1. In that case, the control unit 11 of the payment support apparatus 1 may acquire the information from the facility terminal 2 or the server to execute a process such as the payment support process (see, for example, FIG. 8) described below.

In addition, control programs such as a payment support program are stored in the storage unit 12, wherein the payment support program is used to execute the payment support process (see, for example, FIG. 8) that is described below. For example, the payment support program is recorded on a non-transitory computer-readable recording medium such as a USB, a CD, or a DVD, and is read from the recording medium by a reader (not shown) such as a USB drive, a CD drive or a DVD drive electrically connected to the payment support apparatus 1, and the payment support program is stored in the storage unit 12. In addition, the payment support program may be downloaded from a server that can be accessed by the payment support apparatus 1, and stored in the storage unit 12.

The control unit 11 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 11 controls the payment support apparatus 1 by causing the CPU to execute various types of control programs that have been stored in the ROM or the storage unit 12 in advance.

Specifically, as shown in FIG. 1, the control unit 11 includes various processing units such as an acquisition processing unit 111, a communication state determination processing unit 112, a time determination processing unit 113, a payment processing unit 114, and a notification processing unit 115. It is noted that the control unit 11 functions as the acquisition processing unit 111, the communication state determination processing unit 112, the time determination processing unit 113, the payment processing unit 114, and the notification processing unit 115 when it causes the CPU to execute various processes in accordance with the payment support program. In addition, a part or all of the processing units of the control unit 11 may be provided as an electronic circuit. It is noted that the payment support program may be a program for functioning a plurality of processors as the various processing units.

The acquisition processing unit 111 acquires identification information (terminal IDs) of user terminals 3 of the users who have visited the restaurant. For example, when a user enters the restaurant, is seated at a table with a desired table number, and performs the check-in process (described below) on a facility terminal 2 installed on the table by using his/her user terminal 3, the acquisition processing unit 111 acquires a terminal ID of the user terminal 3 from the facility terminal 2. The acquisition processing unit 111 registers the acquired terminal ID in the terminal information D2 (see FIG. 3) in association with the identification information (table number) of the table. It is noted that the user terminal 3, after having entered the restaurant, establishes a connection with the access point of the wireless LAN of the restaurant, and becomes possible to perform a data communication with the payment support apparatus 1 and the facility terminal 2.

The communication state determination processing unit 112 determines the communication state of the user terminal 3. The communication state determination processing unit 112 is an example of a communication state determination processing circuit of the present disclosure. For example, the communication state determination processing unit 112 monitors the connection state between the user terminal 3 and the access point to determine whether the communication state is the interrupted state or the off-line state in either case the communication with the user terminal 3 is not available. The communication state determination processing unit 112 monitors the connection state by performing a data communication with the access point, and determines the communication state of the user terminal 3. For example, when the power supply of the user terminal 3 becomes "off" state or the communication becomes the off-line state, the communication between the user terminal 3 and the access point becomes unavailable. In this case, the communication state determination processing unit 112 determines that the communication with the user terminal 3 has been interrupted.

In addition, when the connection state between the user terminal 3 and the access point is in an on-line state, the communication state determination processing unit 112 determines the communication state (any one of the communication levels "1" to "5") in accordance with the values of indexes such as the radio wave intensity and the communication speed. The communication state determination processing unit 112 registers the determination result concerning the communication state in the terminal information D2 (see FIG. 3). For example, the communication state determination processing unit 112 registers any one of the communication levels "0" to "5" in correspondence with each of the terminal IDs. In addition, the communication state determination processing unit 112 always monitors the connection state between each of user terminals 3 within the restaurant and the access point, determines the communication states of the user terminals 3, and sequentially updates the terminal information D2.

The time determination processing unit 113 is configured to, when the communication state determination processing unit 112 determines that communication of the user terminal 3 has been interrupted, execute a time determination process S10 (see FIG. 8) to determine whether the interrupted state of communication of the user terminal 3 has continued for a predetermined time period. The time determination processing unit 113 is an example of a time determination processing circuit of the present disclosure. For example, when the power supply of the user terminal 3 has become "off" state, and the communication state determination processing unit 112 determines that communication of the user terminal 3 has been interrupted, the time determination processing unit 113 starts to measure the time. The time determination processing unit 113 keeps measuring the time while communication of the user terminal 3 is interrupted. The time determination processing unit 113 registers the measured time in the terminal information D2 in association with the terminal ID. In addition, the time determination processing unit 113 determines whether or not the measured time has reached a predetermined time period. The predetermined time period is set, for example, in a range from several minutes to several tens of minutes.

Here, if, after the time determination processing unit 113 starts to measure the time, the communication state determination processing unit 112 determines that the user terminal 3 has recovered (restored) from an incommunicable state (interrupted state) to a communicable state (on-line), the time determination processing unit 113 stops measuring the time, and resets the measurement of the time.

The payment processing unit 114 executes a process regarding the payment of a facility use price. The payment processing unit 114 may perform a payment process to complete the payment of a use price, or perform a payment request process to transmit a payment request for a use price to a payment company server (payment apparatus). The following describes an example case where the payment processing unit 114 performs the payment process. An example case where the payment processing unit 114 performs the payment request process is described below. Here is described an example case where the payment processing unit 114 performs the normal payment process. For example, after finishing a food and/or a drink that the user A had ordered at the table T3, the user A exits the restaurant while carrying the user terminal 3 (with the terminal ID "0001") kept in the communicable state. After a user exits the restaurant, the payment support apparatus 1 detects that the user terminal 3 has left the restaurant, from a data communication performed between the payment support apparatus 1 and the user terminal 3 or between the facility terminal 2 and the user terminal 3. Upon acquiring, from the control unit 11, a detection result indicating that a user terminal 3 has left the restaurant, the payment processing unit 114 executes a payment process for a use price "M1" associated with the terminal ID "0001" in the terminal information D2 (see FIG. 3) based on payment information "C1" in the user information D1 (see FIG. 2). Upon completion of the payment, the payment processing unit 114 notifies the facility terminal 2 and the user terminal 3 of payment completion information. In this way, when the user terminal 3 is in the normal communication state (communicable state), the payment processing unit 114 executes the payment process upon detecting an exit of the user terminal 3. It is noted that the payment processing unit 114 may execute the payment process after it acquires a detection result indicating that the user terminal 3 has left the restaurant, and receives payment request information from the user terminal 3. In this configuration, for example, when a user confirms his/her use price by pressing an accounting button on the facility terminal 2 or the user terminal 3, an application (restaurant application) installed in the user terminal 3 is activated, and the payment request information is transmitted by a wireless communication (Bluetooth or the like) to the payment support apparatus 1. With this configuration, the detection result and the payment request information can be acquired from the user terminal 3 when the user exits the restaurant. This improves the reliability for the payment process. It is noted that the payment request information may include information concerning the payment method (credit card, electronic money, points or the like) specified by the user.

On the other hand, when the user terminal 3 is in the incommunicable state (interrupted state), namely, when the power supply is in "off" state, when the communication is in the off-line state, or when a position detection function is in "off" state, it is not possible to detect whether or not a user has left a restaurant. In view of this, the payment processing unit 114 may execute the payment process on condition that the communication state determination processing unit 112 determines that communication of the user terminal 3 has been interrupted. The payment processing unit 114 is an example of a payment processing circuit of the present disclosure. In addition, the payment processing unit 114 may execute the payment process at a time point when the interrupted state of communication has continued for a predetermined time period since the determination of the communication interruption.

For example, a user may perform an illegal act of not paying the use price by intentionally powering off the user terminal 3 or setting the communication state to off-line. In view of this, the communication state determination processing unit 112 may acquire operation information that indicates operations performed on the user terminal 3 by the user and determine whether or not the communication interruption of the user terminal 3 was caused by a user operation performed on the user terminal 3. Subsequently, when the communication state determination processing unit 112 determines that the communication interruption of the user terminal 3 was caused by a user operation performed on the user terminal 3, the payment processing unit 114 executes the payment process at the time point of the determination.

On the other hand, when communication of the user terminal 3 has been interrupted due to a cause other than a user operation, it cannot be said that the user intentionally caused the interrupted state of the user terminal 3, and the payment processing unit 114 executes the payment process after an elapse of a predetermined time period.

For example, the payment processing unit 114 executes the payment process when the time determination processing unit 113 determines that the interrupted state has continued for a predetermined time period. That is, the payment processing unit 114 does not execute the payment process for the predetermined time period from the start of the communication interruption of the user terminal 3, and executes the payment process when the predetermined time period has elapsed since the start of the communication interruption of the user terminal 3. As a result, for example, when the user terminal 3 is restored from the incommunicable state to the communicable state, the payment processing unit 114 aborts the payment process, and does not execute the payment process.

As described above, when communication of the user terminal 3 is interrupted, the payment processing unit 114 recognizes that the user terminal 3 has left a predetermined area (facility), and executes the payment process. Upon executing the payment process while the user terminal 3 is in the interrupted state, the payment processing unit 114 notifies the facility terminal 2 of the payment completion information. In addition, the payment processing unit 114 may transmit the payment completion information to the e-mail address of the user terminal 3.

Figure 4:
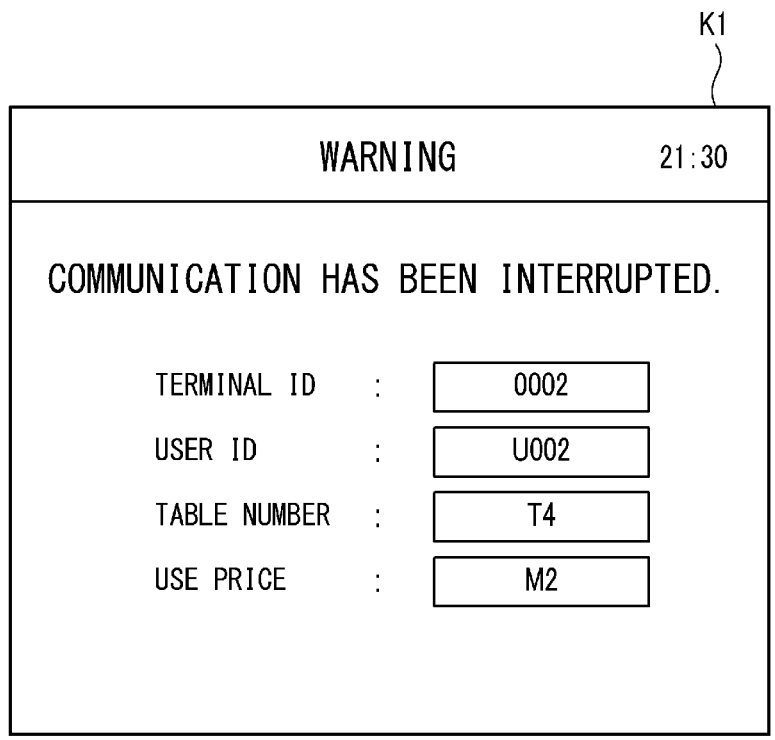
FIG. 4 is a diagram showing an example of a display screen displayed in the payment support system according to the embodiment of the present disclosure.

When the communication state determination processing unit 112 determines that communication of the user terminal 3 has been interrupted, the notification processing unit 115 causes the facility terminal 2 to execute a notification process. The notification processing unit 115 is an example of a notification processing circuit of the present disclosure. For example, when the power supply of the user terminal 3 has become "off" state, and the communication state determination processing unit 112 determines that communication of the user terminal 3 has been interrupted, the notification processing unit 115 causes the facility terminal 2 to notify information indicating that communication of the user terminal 3 has been interrupted. For example, as shown in FIG. 4, the notification processing unit 115 displays warning information K1 on an operation/display unit 23 of the facility terminal 2. The warning information K1 includes, for example: a message indicating that the communication has been interrupted; the terminal ID of the user terminal 3; the user ID; the table number; and the use price.

In addition, when the time determination processing unit 113 executes the time determination process S10 (see FIG. 8), the notification processing unit 115 displays, for example, the warning information K1 shown in FIG. 5 on the operation/display unit 23. The warning information K1 shown in FIG. 5 includes: a message indicating that the payment is to be executed; a measured time (elapsed time); and an estimated time at which the payment is to be executed. In addition, the notification processing unit 115 may display, with the warning information K1, a countdown from the current time to the estimated time of the payment.

With the above-described configuration, for example, a staff member carrying the facility terminal 2 can confirm the warning information K1 and recognize that the user terminal 3 is in the incommunicable state. For example, if a user intentionally powers off his/her user terminal 3 before exiting the restaurant after finishing eating, the staff member can recognize that the user terminal 3 has been interrupted. It is noted that the notification processing unit 115 may transmit the warning information K1 to the e-mail address of the user terminal 3. For example, when the communication state determination processing unit 112 determines that communication of the user terminal 3 has been interrupted, the notification processing unit 115 may transmit the warning information K1 to the e-mail address of the user terminal 3. Furthermore, for example, when the communication state determination processing unit 112 expects a communication interruption of the user terminal 3 based on, for example, the communication intensity, the radio wave intensity, the communication speed, and a user operation on the user terminal 3, the notification processing unit 115 may transmit the warning information K1 to the e-mail address of the user terminal 3.

[Facility Terminal 2]

As shown in FIG. 1, the facility terminal 2 includes a control unit 21, a storage unit 22, the operation/display unit 23, and a communication interface 24. For example, the facility terminal 2 may be an information processing apparatus such as a tablet terminal or a personal computer. The facility terminal 2 may be a self-order terminal that is operated by a user of the restaurant, or may be an order terminal that is operated by a staff member of the restaurant.

The communication interface 24 is configured to connect the facility terminal 2 to the communication network N1 wirelessly or with cable, and execute a data communication with external devices such as the payment support apparatus 1 and the user terminal 3 via the communication network N1 in accordance with the predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations. The operation/display unit 23 displays a check-in screen, a menu screen for foods and drinks, and an accounting screen. In addition, the operation/display unit 23 receives a user operation performed to select a menu on the menu screen.

The storage unit 22 is a nonvolatile storage unit such as a HDD, a SSD, or a flash memory that stores various types of information. For example, control programs such as a browser program are stored in the storage unit 22. Specifically, the browser program is a control program that causes the control unit 21 to execute a communication process with external devices such as the payment support apparatus 1 and the user terminal 3 in accordance with a communication protocol such as HTTP (Hypertext Transfer Protocol).

In addition, the storage unit 22 stores data of the check-in screen, the menu screen, and the accounting screen displayed on the operation/display unit 23.

The control unit 21 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 21 controls the facility terminal 2 by causing the CPU to execute various types of control programs that have been stored in the ROM or the storage unit 22 in advance.

Specifically, the control unit 21 functions as a browser processing unit 211 when it executes various processes in accordance with the browser program stored in the storage unit 22. The browser processing unit 211 is configured to execute a browser process to display, on the operation/display unit 23, various information provided from the payment support apparatus 1 via the communication network N1, and input an operation performed on the operation/display unit 23, to the payment support apparatus 1. It is noted that a part or all of the processing units of the control unit 21 may be provided as an electronic circuit.

For example, the control unit 21 receives a check-in operation from a user who is seated at a table. The user holds a QR code (including the terminal ID and the user ID) displayed on the user terminal 3, over a QR code reading unit of the facility terminal 2. The control unit 21 acquires the terminal ID and the user ID from the read QR code, and transmits the information of the acquired terminal ID and user ID to the payment support apparatus 1.

In addition, for example, the control unit 21 transmits, to the payment support apparatus 1, information (order information) of foods and drinks selected by the user on the menu screen, together with the identification information of the table (table number). In addition, the control unit 21 may transmit the order information to a kitchen terminal (not shown).

[User Terminal 3]

As shown in FIG. 1, the user terminal 3 includes a control unit 31, a storage unit 32, an operation/display unit 33, and a communication interface 34. The user terminal 3 is a mobile terminal carried by a user of a restaurant, and is, for example, a mobile-type information processing apparatus such as a smartphone, a mobile phone, or a tablet terminal.

The communication interface 34 is configured to connect the user terminal 3 to the communication network N1 wirelessly or with cable, and execute a data communication with external devices such as the payment support apparatus 1 and the facility terminal 2 via the communication network N1 in accordance with the predetermined communication protocol.

The operation/display unit 33 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 32 is a nonvolatile storage unit such as a flash memory that stores various types of information. For example, control programs for causing the photoconductor drum 31 to execute various processes are stored in the storage unit 32.

The control unit 31 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 31 controls the user terminal 3 by causing the CPU to execute various types of control programs that have been stored in the ROM or the storage unit 32 in advance.

Specifically, the control unit 31 includes various types of processing units such as a reception processing unit 311 and a display processing unit 312. It is noted that the control unit 31 functions as the various types of processing units when it causes the CPU to execute various processes in accordance with the control programs. In addition, a part or all of the processing units of the control unit 31 may be provided as an electronic circuit.

The reception processing unit 311 acquires information of an operation performed by a user of the restaurant on the operation/display unit 33 of the user terminal 3. For example, the reception processing unit 311 acquires information of a user registration operation performed by the user on the web site managed by the restaurant. In addition, the reception processing unit 311 acquires information of a check-in operation performed by the user at a table of the restaurant. For example, the reception processing unit 311 receives an operation from the user for reading a QR code that includes the terminal ID and the user ID.

In addition, for example, the reception processing unit 311 acquires information of: an operation for switching between "on" state and "off" state of the power supply of the user terminal 3; an operation for switching between on-line and off-line of the communication state; and an operation for switching between "on" state and "off" state of the position detection function.

The display processing unit 312 displays various types of information on the operation/display unit 33. For example, the display processing unit 312 displays information of the web site (the user registration screen or the like) on the operation/display unit 33. In addition, for example, the display processing unit 312 displays the QR code on the operation/display unit 33. In addition, for example, the display processing unit 312 displays, on the operation/display unit 33, various messages transmitted from the payment support apparatus 1.

In addition, when the position detection function is in the "on" state, the control unit 31 acquires position information of the user terminal 3 by using a communication function such as GPS (Global Positioning System) or beacon. The control unit 31 transmits the acquired position information to the payment support apparatus 1 together with the terminal ID.

As another embodiment, the control unit 31 of the user terminal 3 may include a notification processing unit (an example of the notification processing circuit of the present disclosure). For example, in a configuration where when the communication state determination processing unit 112 of the payment support apparatus 1 determines that communication of the user terminal 3 has been interrupted, the payment support apparatus 1 transmits the warning information K1, the notification processing unit displays, on the operation/display unit 33 of the user terminal 3, information corresponding to the warning information K1. For example, as shown in FIG. 6, the notification processing unit displays, on the operation/display unit 33, payment execution information K2 indicating that the payment process has been executed. The payment execution information K2 includes: a message indicating that the payment was made; and a date and time at which the payment was completed. In addition, for example, in a configuration where when the communication state determination processing unit 112 expects a communication interruption of the user terminal 3, the payment support apparatus 1 transmits the warning information K1, the notification processing unit displays, on the operation/display unit 33, information corresponding to the received warning information K1. For example, as shown in FIG. 7, the notification processing unit displays payment announcement information K3 on the operation/display unit 33. The payment announcement information K3 includes: a message indicating that the payment is to be executed; a message indicating that the payment is to be aborted when the communication is restored; and an estimated time of the execution of the payment. In this case, for example, the user confirms the payment announcement information K3 displayed on the operation/display unit 33 in the state where communication of the user terminal 3 is interrupted (off-line state). In this way, even when communication of the user terminal 3 is interrupted, if the power supply of the user terminal 3 is in the "on" state, it is possible to notify the user of the payment announcement information K3.

[Payment Support Process]

Figure 8:
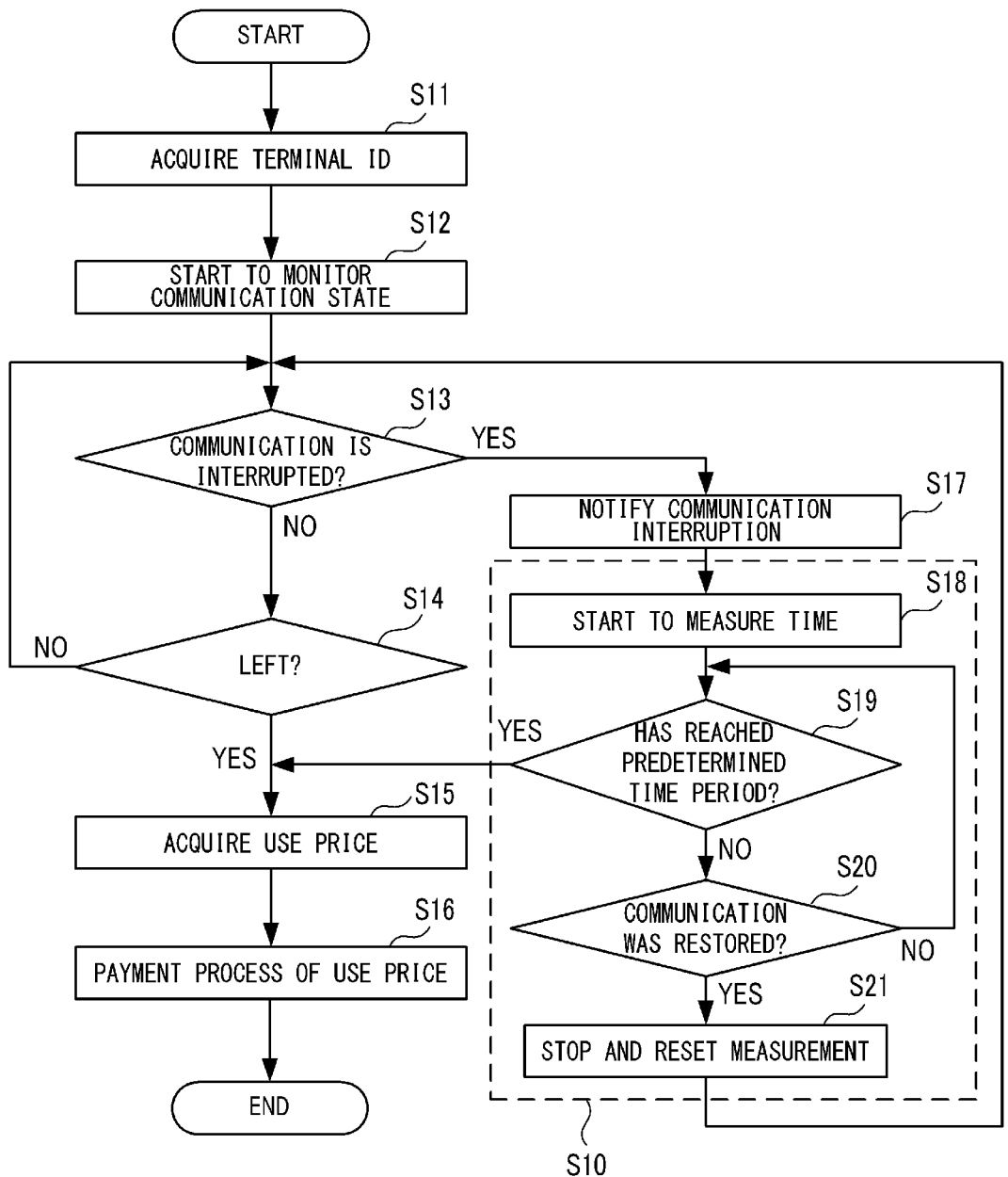
FIG. 8 is a flowchart showing an example of a procedure of a payment support process executed in the payment support system according to the embodiment of the present disclosure.

The following describes an example of a payment support process executed by the control unit 11 of the payment support apparatus 1, with reference to FIG. 8. The control unit 11 starts to execute the payment support process by starting to execute the payment support program when a user performs a predetermined operation, such as when a user performs a check-in operation on a facility terminal 2 by using a user terminal 3. It is noted that the payment support process may be ended halfway in response to a predetermined operation performed on the payment support apparatus 1.

It is noted that the present disclosure can be considered as an invention of a payment support method that executes one or more steps included in the payment support process.

In addition, one or more steps included in the payment support process described here may be omitted as necessary. In addition, the steps constituting the payment support process may be executed in a different order as far as the same action and effect are produced. Furthermore, although the present embodiment describes an example case where the steps constituting the payment support process are executed by the control unit 11, in another embodiment, the steps may be executed by a plurality of processors by distribution.

First, in step S11, the control unit 11 acquires a terminal ID of a user terminal 3 that is owned by a user who entered the restaurant. For example, when the user performs the check-in operation on (for example, holds the QR code over) a facility terminal 2 installed on a table by using the user terminal 3, the control unit 11 acquires the terminal ID of the user terminal 3 and the user ID. The acquisition processing unit 111 registers the acquired terminal ID in the terminal information D2 (see FIG. 3) in association with the identification information (table number) of the table.

Next, in step S12, the control unit 11 starts to monitor the communication state of the user terminal 3. Specifically, the control unit 11 monitors connection state between the user terminal 3 and an access point of a wireless LAN in the restaurant. The control unit 11 acquires communication states of user terminals 3 whose terminal IDs have been acquired, and registers the acquired communication states in the terminal information D2 (see FIG. 3) in association with the terminal IDs. For example, the control unit 11 registers any one of communication levels "0" to "5" in correspondence with the communication intensity of each of user terminals 3. The control unit 11 always monitors the connection states, and sequentially updates the communication levels of the user terminals 3.

In step S13, the control unit 11 determines whether or not communication of the user terminal 3 has been interrupted. When it is determined that communication of the user terminal 3 has been interrupted (S13: YES), the process moves to step S17. When it is determined that communication of the user terminal 3 has not been interrupted (S13: NO), namely, when the user terminal 3 is in the communicable state, the process moves to step S14. Steps S12 and S13 are an example of a communication state determination step of the present disclosure.

In step S14, the control unit 11 determines whether or not the user terminal 3 has left the restaurant. For example, after finishing eating, the user exits the restaurant while carrying the user terminal 3 kept in the communicable state. After the user exits the restaurant, the control unit 11 detects that the user terminal 3 has left the restaurant, from a data communication performed with the user terminal 3. It is noted that the control unit 11 may detect the exit of the user terminal 3 from the restaurant by acquiring position information from the user terminal 3 by using a communication function such as the GPS or beacon. When it is determined that the user terminal 3 has left the restaurant (S14: YES), the process moves to step S15. When it is determined that the user terminal 3 has not left the restaurant (S14: NO), the process returns to step S13 and executes the above-described determination process. That is, while the user stays in the restaurant with the user terminal 3 kept in the communicable state, the processes of steps S13 and S14 are repeated.

In step S15, the control unit 11 acquires a use price of the user. For example, the control unit 11 acquires a use price associated with the terminal ID in the terminal information D2 (see FIG. 3).

Next, in step S16, the control unit 11 executes the payment process to perform payment of the acquired use price. For example, the control unit 11 executes the payment process of the use price based on the payment information in the user information D1 (see FIG. 2). After the payment is completed, the control unit 11 notifies the facility terminal 2 and the user terminal 3 of the payment completion information. In this way, in a case where the user terminal 3 is in a normal communication state (communicable state), the control unit 11 executes the payment process upon detection of an exit of the user terminal 3. For example, the control unit 11 executes the payment process of the use price "M1" for the user A carrying the user terminal 3 (terminal ID "0001") that is in a normal communication state.

On the other hand, when it is determined that communication of the user terminal 3 has been interrupted (S13: YES), the process moves to step S17 in which the control unit 11 causes the facility terminal 2 to notify information indicating that communication of the user terminal 3 has been interrupted. Specifically, for example, the facility terminal 2 displays the warning information K1 shown in FIG. 4 or FIG. 5 on the operation/display unit 23. Step S17 is an example of a notification step of the present disclosure.

Next, in step S18, the control unit 11 starts to measure the time. The control unit 11 registers the measured time in the terminal information D2 in association with the terminal ID, and updates it as necessary.

Next, in step S19, the control unit 11 determines whether or not the measured time has reached a predetermined time period. That is, the control unit 11 determines whether or not the interrupted state of communication of the user terminal 3 has continued for the predetermined time period. When it is determined that the measured time has reached the predetermined time period (S19: YES), the process moves to step S15. On the other hand, when it is determined that the measured time has not reached the predetermined time period (S19: NO), the process moves to step S20.

In step S20, the control unit 11 determines whether or not communication of the user terminal 3 has been restored to the communicable state. When it is determined that the user terminal 3 has been restored from the incommunicable state (interrupted state) to the communicable state (on-line) (S20: YES), the process moves to step S21. On the other hand, when it is determined that the user terminal 3 has not been restored from the interrupted state to the communicable state (S20: NO), the process returns to step S19. In this way, when the user terminal 3 is not restored from the interrupted state to the communicable state within the predetermined time period, the process moves to step S15; and when the user terminal 3 is restored from the interrupted state to the communicable state within the predetermined time period, the process moves to step S21.

In step S21, the control unit 11 stops and resets the measurement of the time. Thereafter, the process returns to step S13. Upon returning to step S13, the control unit 11 repeats the above-described processes.

When the interrupted state of communication of the user terminal 3 has continued for the predetermined time period (S19: YES), the process moves to step S15 in which the control unit 11 acquires the use price. For example, the control unit 11 acquires a use price associated with the terminal ID in the terminal information D2 (see FIG. 3).

Next, in step S16, the control unit 11 executes the payment process to perform payment of the acquired use price. For example, the control unit 11 executes the payment process for the use price based on the payment information in the user information D1 (see FIG. 2). After the payment is completed, the control unit 11 notifies the facility terminal 2 and the user terminal 3 of the payment completion information. In this way, in a case where the user terminal 3 is in the interrupted state, the control unit 11 executes the payment process on condition that the interrupted state has continued for the predetermined time period. For example, the control unit 11 executes the payment process of the use price "M2" for the user B carrying the user terminal 3 (terminal ID "0002") that is in the interrupted state. Steps S15 and S16 are an example of a payment step of the present disclosure.

In addition, the control unit 11 may transmit the warning information K1 to the e-mail address of the user terminal 3 at an arbitrary timing such as in step S16 or S17. Upon receiving the warning information K1 in correspondence with the process of step S16, the user terminal 3 displays the payment execution information K2 (see FIG. 6) on the operation/display unit 33; and upon receiving the warning information K1 in correspondence with the process of step S17, the user terminal 3 displays the payment announcement information K3 (see FIG. 7) on the operation/display unit 33.

The control unit 11 executes the payment support process as described above. As another embodiment, when it is determined that communication of the user terminal 3 has been interrupted (S13: YES), the control unit 11 may first execute the notification process of step S17, and then move step S15 to execute the payment process. That is, in the above-described payment support process, the time determination process S10 of steps S18 to S21 may be omitted.

According to the payment support system 100 described above, if communication of a user terminal 3 of a user using a facility is interrupted, the payment process is executed to perform payment of a use price of the facility, and notifies, on at least one of the facility terminal 2 and the user terminal 3, that the communication has been interrupted. With this configuration, even when the user has intentionally interrupted communication of the user terminal 3 in order to escape the payment of a use price of the facility, it is possible to complete the payment of the use price. In addition, since the staff of the facility can recognize the communication interruption of the user terminal 3, it is possible to prevent the user from performing an illegal act. In addition, the payment support system 100 may execute the payment process of the use price if the interrupted state of communication of the user terminal 3 has continued for a predetermined time period. Furthermore, when the user terminal 3 is restored from the interrupted state to the communicable state within the predetermined time period, the payment support system 100 may stop and reset the measurement of the time, and stop the payment process. This prevents the payment process from being executed when communication of the user terminal 3 is temporarily interrupted due to a change in communication environment. In addition, since the number of unnecessarily executed payment processes is reduced, it is possible to restrict the number of communications with the payment support apparatus 1, the facility terminal 2, the user terminal 3, and the payment company (not shown) that are performed in connection with the payment process, thereby making it possible to reduce the communication traffic and effectively use the computer resources.

The present disclosure is not limited to the above-described embodiment. The following describes other embodiments (Modifications) of the payment support system 100.

Figure 9:
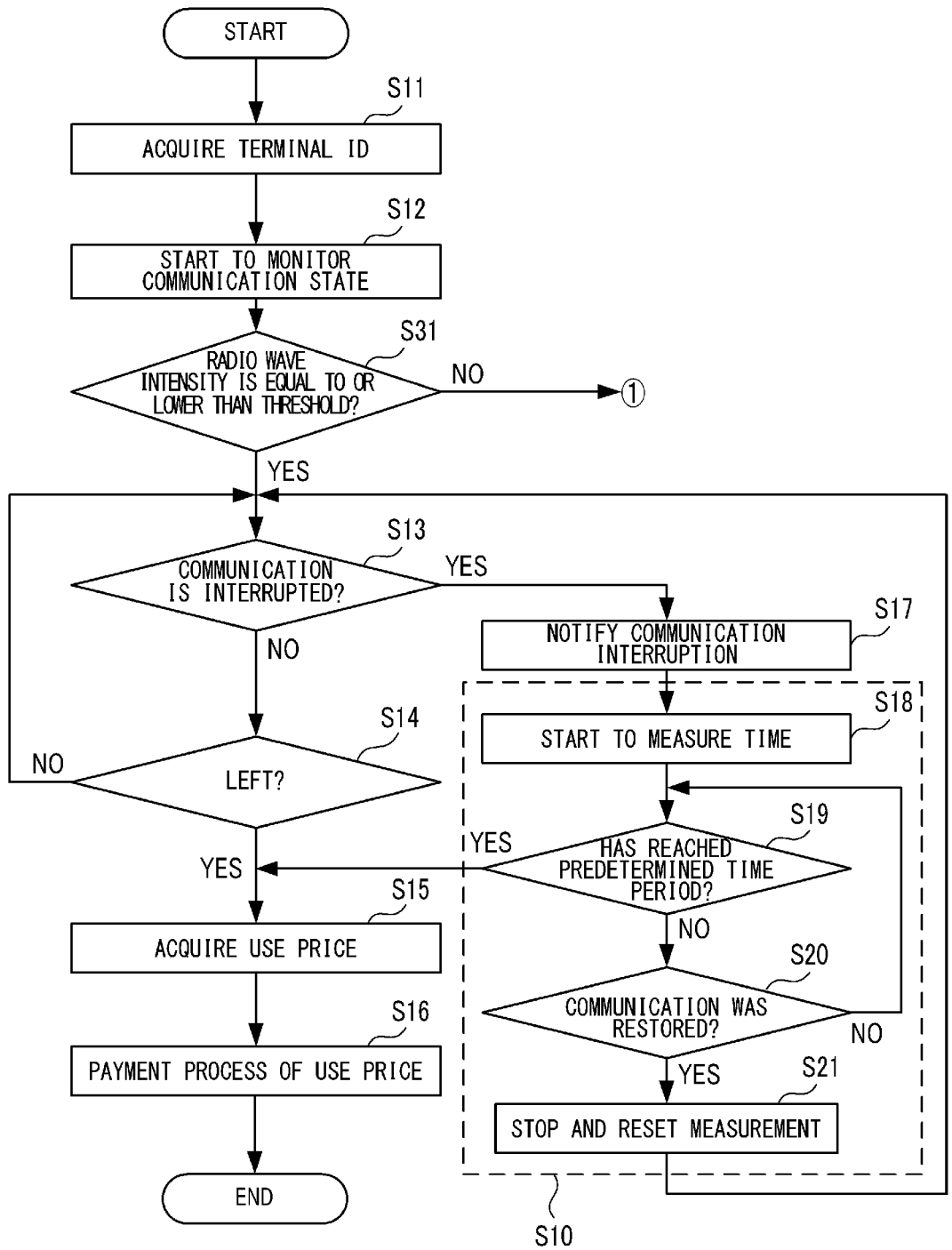
FIG. 9 is a flowchart showing another example of a procedure of the payment support process executed in the payment support system according to the embodiment of the present disclosure.
Figure 10:
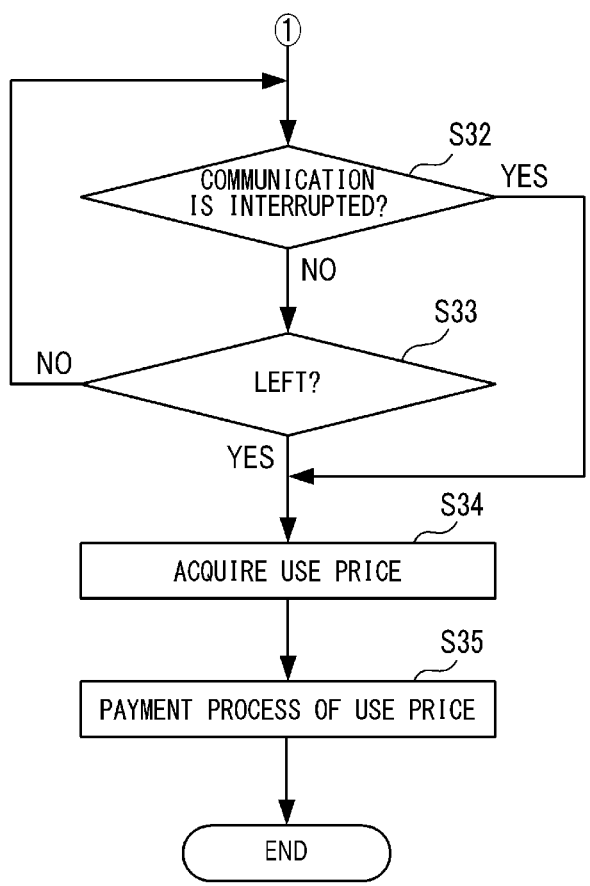
FIG. 10 is a flowchart showing another example of a procedure of the payment support process executed in the payment support system according to the embodiment of the present disclosure.

In the payment support system 100 according to Modification 1, the time determination processing unit 113 acquires the radio wave intensity of the user terminal 3, and when the acquired radio wave intensity is equal to or lower than a threshold, and the communication state determination processing unit 112 determines that communication of the user terminal 3 has been interrupted, the time determination processing unit 113 executes the time determination process S10. FIG. 9 is a flowchart showing an example of the payment support process corresponding to Modification 1. The same processes as those of the payment support process shown in FIG. 8 are assigned the same step numbers. In the payment support process shown in FIG. 9, in step S31, the control unit 11 acquires the radio wave intensity of the user terminal 3, and determines whether or not the acquired radio wave intensity is equal to or lower than a threshold. Upon determining that the radio wave intensity is equal to or lower than the threshold (S31: YES), the control unit 11 moves the process to step S13 to execute the payment support process including the time determination process S10. On the other hand, upon determining that the radio wave intensity is higher than the threshold (S31: NO), the control unit 11 moves the process to step S32 (see FIG. 10). It is noted that the radio wave intensity and the threshold may be defined by the communication levels ("0" to "5") corresponding to the communication states. In this case, for example, the threshold is set to "2".

In step S32, the control unit 11 determines whether or not communication of the user terminal 3 has been interrupted. When it is determined that communication of the user terminal 3 has been interrupted (S32: YES), the process moves to step S34. When it is determined that communication of the user terminal 3 has not been interrupted (S32: NO), namely, when the user terminal 3 is in the communicable state, the process moves to step S33. Steps S33 to S35 are respectively the same as steps S14 to S16 shown in FIG. 8.

Here, if communication of the user terminal 3 is interrupted while the radio wave intensity thereof is weak, it is considered that communication of the user terminal 3 is interrupted due to a change in the communication environment, and that the possibility of an illegal act performed by the user is low. On the other hand, if communication of the user terminal 3 is interrupted while the radio wave intensity thereof is strong, it is considered that communication of the user terminal 3 is intentionally interrupted by the user, and that the possibility of an illegal act performed by the user is high. According to the configuration of Modification 1, when the radio wave intensity is weak, the time determination process S10 is executed before the payment process is executed (see FIG. 9); and when the radio wave intensity is strong, the payment process is executed without executing the time determination process S10 (see FIG. 10). With this configuration, it is possible to execute the payment process appropriately in response to the radio wave intensity and the communication state of the user terminal 3.

In the payment support system 100 according to Modification 2, the time determination processing unit 113 acquires the battery remaining amount (charged amount) of the user terminal 3, and when the acquired battery remaining amount is equal to or lower than a threshold, and the communication state determination processing unit 112 determines that communication of the user terminal 3 has been interrupted, the time determination processing unit 113 executes the time determination process S10. That is, in the payment support system 100 according to Modification 2, "radio wave intensity" in the payment support process shown in FIG. 9 of Modification 1 is replaced with "battery remaining amount". In Modification 2, for example, in step S31 shown in FIG. 9, the control unit 11 acquires the battery remaining amount of the user terminal 3, and determines whether or not the acquired battery remaining amount is equal to or lower than the threshold. Upon determining that the battery remaining amount is equal to or lower than the threshold (S31: YES), the control unit 11 moves the process to step S13 to execute the payment support process including the time determination process S10. On the other hand, upon determining that the battery remaining amount is higher than the threshold (S31: NO), the control unit 11 moves the process to step S32 (see FIG. 10).

Here, if communication of the user terminal 3 is interrupted while the battery remaining amount thereof is low, it is considered that communication of the user terminal 3 is interrupted due to a shortage of battery remaining amount, and that the possibility of an illegal act performed by the user is low. On the other hand, if communication of the user terminal 3 is interrupted while the battery remaining amount thereof is high, it is considered that communication of the user terminal 3 is intentionally interrupted by the user, and that the possibility of an illegal act performed by the user is high. According to the configuration of Modification 2, when the battery remaining amount is low, the time determination process S10 is executed before the payment process is executed (see FIG. 9); and when the battery remaining amount is high, the payment process is executed without executing the time determination process S10 (see FIG. 10). With this configuration, it is possible to execute the payment process appropriately in response to the battery remaining amount and the communication state of the user terminal 3.

Figure 11:
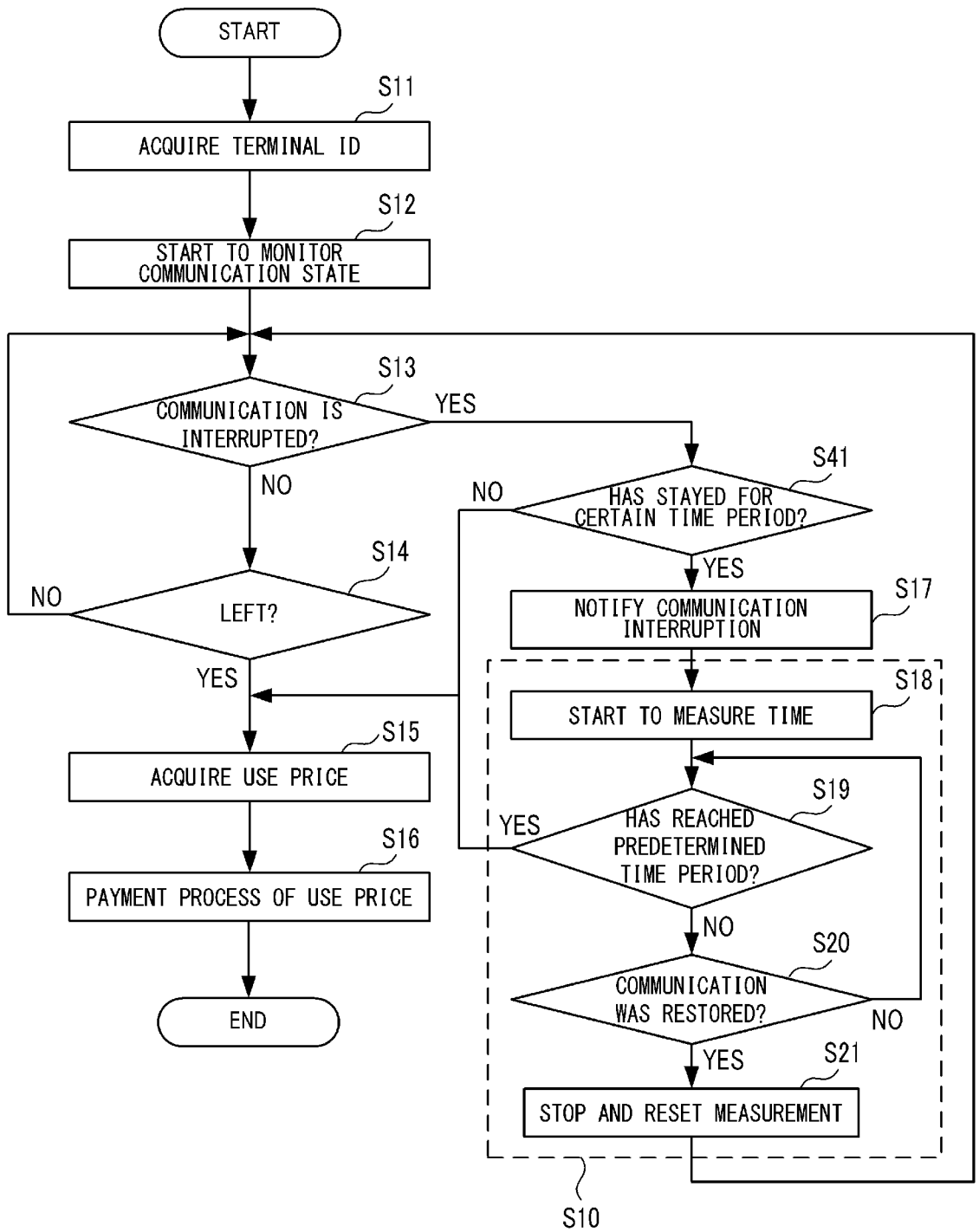
FIG. 11 is a flowchart showing another example of a procedure of the payment support process executed in the payment support system according to the embodiment of the present disclosure.

In the payment support system 100 according to Modification 3, the time determination processing unit 113 acquires the current position of the user terminal 3, and when the user terminal 3 has stayed in the restaurant for a certain time period or more, and the communication state determination processing unit 112 determines that communication of the user terminal 3 has been interrupted, the time determination processing unit 113 executes the time determination process S10. FIG. 11 is a flowchart showing an example of the payment support process corresponding to Modification 3. The same processes as those of the payment support process shown in FIG. 8 are assigned the same step numbers. In the payment support process shown in FIG. 11, in step S41, the control unit 11 acquires the current position of the user terminal 3, and determines whether or not the user terminal 3 has stayed in the restaurant for the certain time period or more. Upon determining that the user terminal 3 has stayed in the restaurant for the certain time period or more (S41: YES), the control unit 11 moves the process to step S17 to execute the payment support process including the time determination process S10. On the other hand, upon determining that the user terminal 3 has not stayed in the restaurant for the certain time period or more (S41: NO), the control unit 11 moves the process to step S15.

With the above-described configuration, for users who have stayed in the restaurant for a long time period, the time determination process S10 is performed to prevent the payment process from being executed due to a communication interruption that have not been expected by the users. On the other hand, for users who have stayed in the restaurant only for a short time period, the payment process is executed at a time point when communication of the user terminal 3 is interrupted, thereby preventing the users from performing an illegal act such as leaving without paying the use price that may be done within a short time period.

In the payment support system 100 according to Modification 4, the time determination processing unit 113 acquires a use price of a user or the number of orders of the user (corresponding to an amount of product of the present disclosure), and when the use price or the number of orders exceeds a threshold, and the communication state determination processing unit 112 determines that communication of the user terminal 3 has been interrupted, the time determination processing unit 113 executes the time determination process S10. That is, in the payment support system 100 according to Modification 4, in the payment support process shown in FIG. 11 corresponding to Modification 3, "HAS STAYED FOR CERTAIN TIME PERIOD?" may be replaced with "USE PRICE OR NUMBER OF ORDERS EXCEEDS THRESHOLD?". In Modification 4, for example, in step S41 shown in FIG. 11, the control unit 11 determines whether or not the use price or the number of orders exceeds a threshold. Upon determining that the use price or the number of orders exceeds a threshold (S41: YES), the control unit 11 moves the process to step S17 to execute the payment support process including the time determination process S10. On the other hand, upon determining that the use price or the number of orders has not exceeded the threshold (S41: NO), the control unit 11 moves the process to step S15.

With the above-described configuration, for users having high use prices, the time determination process S10 is performed so as to prevent the payment process from being due to communication interruptions unexpected by the users. On the other hand, for users having low use prices, the payment process is executed at a time point when communication of the user terminal 3 is interrupted so as to prevent the users from performing an illegal act such as leaving without paying a use price that is low and hardly noticed. It is noted that when it is determined that the use price or the number of orders exceeds a threshold (S41: YES), the process may move to step S15, and when it is determined that the use price or the number of orders has not exceeded the threshold (S41: NO), the process may move to step S17.

In the payment support system 100 according to Modification 5, the time determination processing unit 113 acquires the number of uses of the restaurant by a user (or use frequency), and when the number of uses exceeds a threshold, and the communication state determination processing unit 112 determines that communication of the user terminal 3 has been interrupted, the time determination processing unit 113 executes the time determination process S10. That is, in the payment support system 100 according to Modification 5, in the payment support process shown in FIG. 11 corresponding to Modification 3, "HAS STAYED FOR CERTAIN TIME PERIOD?" may be replaced with "NUMBER OF USES EXCEEDS THRESHOLD?". In Modification 5, for example, in step S41 shown in FIG. 11, upon determining that the number of uses exceeds a threshold (S41: YES), the control unit 11 moves the process to step S17 to execute the payment support process including the time determination process S10. On the other hand, upon determining that the number of uses has not exceeded the threshold (S41: NO), the control unit 11 moves the process to step S15.

With the above-described configuration, for users having a high number of uses, the time determination process S10 is performed to prevent the payment process from being executed due to communication interruptions that have not been expected by the users. On the other hand, for users having a low number of uses, the payment process is executed at a time point when communication of the user terminal 3 is interrupted, thereby preventing the users from performing an illegal act such as leaving without paying the use price.

As described above, in the payment support system 100 according to the modifications, even when it is determined that communication of the user terminal 3 has been interrupted, the time determination process S10 is executed when a predetermined condition is satisfied. This allows the payment process to be aborted when, for example, the communication state is restored. In addition, in a case where the time determination process S10 is not executed, the payment support system 100 executes the payment process before a predetermined time period elapses, namely, for example, at a time point when the communication state determination processing unit 112 determines that communication of the user terminal 3 has been interrupted. As a result, it is possible to prevent the payment process from being executed for a user who does not have an intention to perform an illegal act, and it is possible to execute the payment process quickly for a user who is presumed to have an intention to perform an illegal act.

According to the present disclosure, the payment processing unit 114 may execute the payment request process for transmitting a payment request of a facility use price to a payment company server (payment apparatus). The payment request includes information such as the user ID, a shop ID of the restaurant, and a charge for the use price. For example, the payment processing unit 114 may transmit the payment request to the payment company server on condition that the communication state determination processing unit 112 determines that communication of the user terminal 3 has been interrupted. In addition, the payment processing unit 114 may transmit the payment request to the payment company server at a time point when the communication state determination processing unit 112 determines that communication of the user terminal 3 has been interrupted, or at a time point when the interrupted state of communication has continued for a predetermined time period since the determination of the communication interruption. After the payment company server completes the payment for the payment request, the payment processing unit 114 acquires a payment completion notice (authentication notice) from the payment company server. As described above, the payment support system 100 according to the present disclosure may include a payment process for completing the payment of the use price, or may, without including the payment process, transmit a payment request to a payment company server that executes the payment process.

The present disclosure is not limited to the above-described case where a user orders a food and/or a drink in a restaurant, but is applicable to a case where, for example, a user buys a product in a retail store (a convenience store, a supermarket, etc.). For example, the present disclosure is applicable to a system in a retail store where a user carrying a user terminal 3 (mobile terminal) causes the user terminal 3 to read an information code (bar code) of a product that the user desires to buy, and the product price is automatically paid when the user exits the store. In addition, for example, the present disclosure is applicable to a system in a retail store where a user holds a user terminal 3 (mobile terminal) over an entrance gate to enter (check in) the store, a camera installed in the store recognizes products that were taken in the hand of the user to be bought and associates the products with the user terminal 3, and the user holds the user terminal 3 over an exit gate to exit (check out) the store, when the product price is automatically paid.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A payment support system comprising:
   a facility terminal installed in a facility and including a display; and
   memory storing instructions that, when executed by at least one processor, cause the at least one processor to perform the steps of:
      determining a communication state of a user terminal of a user who enters and uses the facility;
      determining whether the user terminal has left the facility or not upon determining that communication of the user terminal has not been interrupted;
      executing a process concerning payment of a price incurred at the facility in response to:
         determining that the user terminal has left the facility, if it is determined that the communication of the user terminal is not interrupted; and
         an interrupted state continuing for a predetermined time period, if it is determined that the communication of the user terminal has been interrupted; and
      causing the facility terminal to issue a notification of predetermined information in response to determining that communication of the user terminal has been interrupted, the notification being displayed on the display of the facility terminal.

2. The payment support system according to claim 1, wherein
   the instructions are further executable to cause the at least one processor to, in response to determining that communication of the user terminal has been restored before the interrupted state continues for the predetermined time period, stop and reset measurement of time since the user terminal has been interrupted, and not execute the process concerning the payment.

3. The payment support system according to claim 1, wherein
   the instructions are further executable to cause the at least one processor to acquire a radio wave intensity of the user terminal, and in response to determining that the acquired radio wave intensity is equal to or lower than a threshold and that communication of the user terminal has been interrupted, start measurement of time since the user terminal has been interrupted.

4. The payment support system according to claim 1, wherein
   the instructions are further executable to cause the at least one processor to acquire a battery remaining amount of the user terminal, and in response to determining that the acquired battery remaining amount is equal to or lower than a threshold and that communication of the user terminal has been interrupted, start measurement of time since the user terminal has been interrupted.

5. The payment support system according to claim 1, wherein
   the instructions are further executable to cause the at least one processor to acquire a current position of the user terminal, and in response to determining that the user terminal has stayed in the facility for a certain time period or more and that communication of the user terminal has been interrupted, start measurement of time since the user terminal has been interrupted.

6. The payment support system according to claim 1, wherein
   the instructions are further executable to cause the at least one processor to, in response to determining that the price or an amount of product ordered by the user exceeds a threshold and that communication of the user terminal has been interrupted, start measurement of time since the user terminal has been interrupted.

7. The payment support system according to claim 1, wherein
   the instructions are further executable to cause the at least one processor to, in response to determining that a number of uses of the facility by the user exceeds a threshold and that communication of the user terminal has been interrupted, start measurement of time since the user terminal has been interrupted.

8. The payment support system according to claim 1, wherein
   in a case where measurement of time since the user terminal has been interrupted is not started, the instructions are further executable to cause the at least one processor to execute the process concerning the payment before the predetermined time period elapses.

9. The payment support system according to claim 1, wherein the instructions are further executable to cause the at least one processor to perform the steps of:
   acquiring operation information that indicates operations performed on the user terminal by the user and determining whether or not a communication interruption of the user terminal was caused by a user operation performed on the user terminal, and
   in response to determining that the communication interruption of the user terminal was caused by a user operation performed on the user terminal, executing the process concerning the payment.

10. The payment support system according to claim 1, wherein
    the instructions are further executable to cause the at least one processor to, in response to determining that power supply of the user terminal has become an OFF state, or the communication has become an off-line state, determining that communication of the user terminal has been interrupted.

11. The payment support system according to claim 1, wherein
    the notification includes at least one of: a message indicating that communication of the user terminal has been interrupted; identification information of the user terminal; identification information of the user; identification information of a table used by the user; and the price.

12. The payment support system according to claim 1, wherein
    the notification includes at least one of: a message indicating that payment of the price is to be executed; a time period that has elapsed since a start of a communication interruption of the user terminal; and an estimated time of execution of the payment of the price.

13. The payment support system according to claim 1, wherein
the instructions are further executable to cause the at least one processor to transmit a user notification to an e-mail address of the user terminal in response to determining that communication of the user terminal has been interrupted.

14. The payment support system according to claim 13, wherein
the user notification includes at least one of: a message indicating that payment of the price is to be executed; a time period that has elapsed since a start of a communication interruption of the user terminal; and an estimated time of execution of the payment of the price.

15. The payment support system according to claim 1, wherein the facility terminal includes the memory and the at least one processor.

16. The payment support system according to claim 1, further comprising a payment support apparatus including the memory and the at least one processor, the payment support apparatus being in communication with the facility terminal.

17. A payment support method executable by one or more processors, the payment support method comprising:
a communication state determination step of determining a communication state of a respective first user terminal and second user terminal of a first user and second user who enter and use a facility, the communication state determination step determining that communication of the first user terminal has not been interrupted and that communication of the second user terminal has been interrupted;
a presence determination step of determining whether the first user terminal has left the facility or not upon determining that communication of the first user terminal has not been interrupted;
a first payment step of executing a process concerning payment of a price incurred at the facility by the first user upon determining that the first user terminal has left the facility;
a second payment step of executing a process concerning payment of a price incurred at the facility by the second user in response to an interrupted state of the second user terminal continuing for a predetermined time period, upon the communication state determination step determining that the communication of the second user terminal has been interrupted; and
a notification step of causing a facility terminal installed in the facility to issue a notification of predetermined information in response to determining that communication of the second user terminal has been interrupted, the notification being displayed on a display of the facility terminal.

18. A non-transitory computer-readable recording medium storing a payment support program for causing one or more processors to execute:
a communication state determination step of determining a communication state of a user terminal of a user who enters and uses a facility;
a presence determination step of determining whether the user terminal has left the facility or not upon determining that communication of the user terminal has not been interrupted;
a payment step of executing a process concerning payment of a price incurred at the facility in response to:
determining that the user terminal has left the facility, if the communication state determination step determines that the communication of the user terminal is not interrupted; and
an interrupted state continuing for a predetermined time period, if the communication state determination step determines that the communication of the user terminal has been interrupted; and
a notification step of causing a facility terminal installed in the facility to issue a notification of predetermined information in response to determining that communication of the user terminal has been interrupted, the notification being displayed on a display of the facility terminal.

* * * * *